US012395455B2

(12) United States Patent
Jiang et al.

(10) Patent No.: US 12,395,455 B2
(45) Date of Patent: Aug. 19, 2025

(54) METHOD, APPARATUS AND DEVICE FOR PROCESSING INSTANT MESSAGE

(71) Applicant: Beijing Zitiao Network Technology Co., Ltd., Beijing (CN)

(72) Inventors: Yan Jiang, Beijing (CN); Yonghao Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/757,403

(22) Filed: Jun. 27, 2024

(65) Prior Publication Data

US 2024/0348566 A1 Oct. 17, 2024

Related U.S. Application Data

(63) Continuation of application No. PCT/CN2022/137997, filed on Dec. 9, 2022.

(30) Foreign Application Priority Data

Dec. 29, 2021 (CN) .......................... 202111643771.9

(51) Int. Cl.
*H04L 51/04* (2022.01)
*H04L 51/18* (2022.01)

(52) U.S. Cl.
CPC .............. *H04L 51/04* (2013.01); *H04L 51/18* (2013.01)

(58) Field of Classification Search
CPC .................................. H04L 51/04; H04L 51/18
See application file for complete search history.

(56) References Cited

U.S. PATENT DOCUMENTS

2014/0280288 A1* 9/2014 Hwang ................ G06Q 10/107
707/766
2014/0280526 A1* 9/2014 Filho ........................ H04W 4/21
709/204

(Continued)

FOREIGN PATENT DOCUMENTS

CN            105871690 A       8/2016
CN            106330677 A       1/2017

(Continued)

OTHER PUBLICATIONS

International Search Report received for PCT/CN2022/137997, mailed Mar. 7, 2023, 5 pages.

(Continued)

*Primary Examiner* — Soe Hlaing
(74) *Attorney, Agent, or Firm* — Astute IP Law Group

(57) ABSTRACT

The present application discloses a method for processing an instant message. For any instant message in any conversation, in response to a first operation triggered for a target message in a first conversation, the target message link corresponding to the target message is obtained. After obtaining the target message link, in response to a second operation triggered by the user in the target application, the target message link is added to the page of the target application, so that the target message link is displayed in the page of the target application. That is, the present application links the target message so that the target message link corresponding to the target message can be added to other applications, thereby the target message is shown in other applications, thus enhancing the circulation of the messages and improving the user experience.

17 Claims, 8 Drawing Sheets

(56) References Cited

U.S. PATENT DOCUMENTS

2017/0118152 A1* 4/2017 Lee ...................... G06F 16/345
2023/0308403 A1* 9/2023 Tao ........................ H04L 51/04

FOREIGN PATENT DOCUMENTS

| | | |
|---|---|---|
| CN | 108156070 A | 6/2018 |
| CN | 110752984 A | 2/2020 |
| CN | 110912803 A | 3/2020 |
| JP | 2013131221 A | 7/2013 |
| JP | 2014-501961 A | 1/2014 |
| JP | 2017-084366 A | 5/2017 |
| JP | 2018-060508 A | 4/2018 |

OTHER PUBLICATIONS

"The Application of Instant Messaging in Office Automation Systems", Information Technology, Aug. 20, 2010, 3 pages, with English Abstract.

Office Action for Chinese Patent Application No. 202111643771.9, mailed on Apr. 4, 2025, 14 pages.

Notice of Reasons for Refusal for Japanese Patent Application No. 2024-539028, mailed on Jun. 10, 2025, 10 pages.

\* cited by examiner

METHOD, APPARATUS AND DEVICE FOR PROCESSING INSTANT MESSAGE

CROSS-REFERENCE TO RELATED APPLICATIONS

This application is a continuation of International Application No. PCT/CN2022/137997, filed on Dec. 9, 2022, which claims the benefit of Chinese Application No. 202111643771.9 filed on Dec. 29, 2021. The entire contents of these applications are hereby incorporated by reference in their entireties.

FIELD

Then present application relates to a field of computer technology, and specifically to a method, apparatus and device for processing an instant message.

BACKGROUND

Currently, the expansion capability for instant messaging (IM) is mainly about forwarding between different conversations, so as to meet the user's need in sharing instant messages between different conversations. However, the above-mentioned expansion capabilities for instant messaging are relatively simple, and can only realize the forwarding of instant messaging messages between different conversations, which cannot meet users' higher need for message forwarding.

SUMMARY

In view of this, embodiments of the present application provide a method, apparatus and device for processing an instant message to enable instant messages to be shared to other applications and enhance the consumption ability of instant messages.

In order to achieve the above purpose, the technical solutions provided by the embodiments of the present application are as follows:

In a first aspect of embodiments of the present application, there is provided a method for processing an instant message, and the method may include:
  in response to a first operation triggered for a target message in a first conversation in an instant messaging application, obtaining a target message link corresponding to the target message; and
  in response to a second operation triggered in a target application, adding the target message link to a page of the target application.

In a second aspect of embodiments of the present application, there is provided an apparatus for processing an instant message, and the apparatus includes:
  an obtaining unit, configured to, in response to a first operation triggered for a target message in a first conversation in an instant messaging application, obtain a target message link corresponding to the target message; and
  an adding unit, configured to, in response to a second operation triggered in a target application, add the target message link to a page of the target application.

In a third aspect of embodiments of the present application, there is provided an electronic device, and the device includes: a processor and a memory;
  the memory, configured to store instructions or computer programs;
  the processor, configured to execute the instructions or computer programs in the memory, so that the electronic device performs a method for processing an instant message described in the first aspect.

In a fourth aspect of embodiments of the present application, there is provided a computer-readable storage medium. Instructions are stored in the computer-readable storage medium, when run on a device, the instructions cause the device to perform a method for processing an instant message described in the first aspect.

In a fifth aspect of embodiments of the present application, there is provided a computer program product. When run on a computer, the computer program product causes the computer to perform a method for processing an instant message described in the first aspect.

It can be seen that the embodiments of this application have the following beneficial effects:

In the embodiments of the present application, for any instant message in any conversation, in response to the first operation triggered by the user for the target message in the first conversation, a target message link corresponding to the target message is obtained. After obtaining the target message link, in response to a second operation triggered by the user in the target application, the target message link is added to the page of the target application, so that the target message link is shown in the page of the target application. That is, the present application links the target message so that the target message link corresponding to the target message can be added to other applications, thereby enhancing the circulation of messages and improving the user experience.

BRIEF DESCRIPTION OF THE DRAWINGS

In order to more clearly illustrate the technical solutions in the embodiments of the present application or the prior art, the drawings needed to describe the embodiments, or the prior art will be briefly introduced below. Obviously, the drawings in the following description are only used for the purpose of describing the embodiments of the present application. For those skilled in the art, other drawings can also be obtained based on these drawings without creative labor.

DETAILED DESCRIPTION

Figure 1:
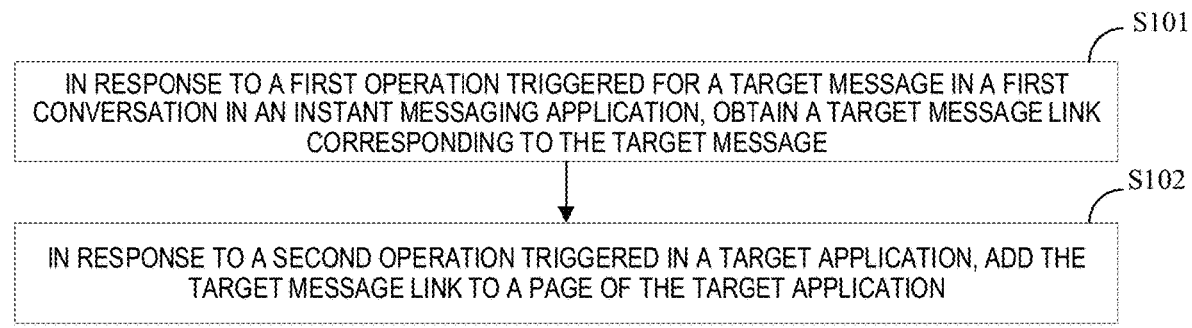
FIG. 1 is a flow chart of a method for processing an instant message provided by an embodiment of the present application.

In order to make those skilled in the art to better understand the solutions of the present application, the technical solutions in the embodiments of the present application will be clearly and completely described below in conjunction with the accompanying drawings in the embodiments of the present application. Obviously, the described embodiments are only part of embodiments of the present application, but not all the embodiments. Based on the embodiments in the present application, all other embodiments obtained by those skilled in the art without creative efforts fall within the scope of protection of the present application.

Currently, when forwarding or sharing instant messages in IM conversations, the forwarding or sharing can only be performed between different conversations. When the instant messages in an IM conversation need to be shared to other applications, the sharing can be only performed by copying or taking screenshots. However, this sharing method only allows users to view part of the information in the screenshot or the copied text information, and the users cannot understand the entire message, resulting in a high cost in understanding the instant messages. For example, when user A uses a cloud document for product reporting, he/she needs to quote feedback from other users in IM and paste the feedback information into the cloud document by taking screenshots. On the one hand, typesetting is required when pasting screenshots into cloud documents, and on the other hand, readers can only browse part of the information in the screenshots but cannot grasp comprehensive information.

Based on this, the embodiments of the present application provide a method for processing an instant message. When the user needs to share a target message in IM to another target application, in response to a triggering operation by the user for the target message, the target message link corresponding to the target message is obtained. After the user triggers a pasting or adding operation in the target application, the target message link is added to the page of the target application, so that the target application presents a corresponding target message on the page of the target application by parsing the target message link. Furthermore, when the target message link is triggered in the page of the target application, it is possible to jump to the page of the first conversation where the target message is located, so that the user can view the context of the target message, which reduces the cost in message understanding and improves the user experience.

It should be noted that the above target application can be a cloud document application, a calendar application, an email application, a browser application or other instant messaging application. Alternatively, the target application is the instant messaging application, and the page of the target application is a page other than a conversation page of the first conversation. Specifically, the page other than the conversation page of the first conversation may be a conversation page of another conversation, or may be a page other than conversation page but related to the first conversation, such as a group announcement of the first conversation. That is, in the present application, the target message link may be added to a page of any one of the above applications.

In order to facilitate understanding of the technical solutions provided by the embodiments of the present application, the following will be described in conjunction with the accompanying drawings.

Refer to FIG. 1, FIG. 1 is a flow chart of a method for processing an instant message provided by an embodiment of the present application. As shown in FIG. 1, this method can be executed by a device for processing an instant message. The device for processing the instant message can be a server, an electronic device, or other devices, which is not limited here. The server may be a cloud server or a server cluster or other device with storage and computing functions. The electronic device may include a mobile phone, a tablet computer, a desktop computer, a notebook computer, a vehicle-mounted terminal, a wearable electronic device, an all-in-one machine, a smart home device or other device with communication functions, or the electronic device may be a device simulated by a virtual machine or simulator. Specifically, the method may include:

S101: in response to a first operation triggered for a target message in a first conversation in an instant messaging application, obtaining a target message link corresponding to the target message.

In this embodiment, the user may trigger the first operation for the target message in any conversation in the instant messaging application, and in response to the first operation, the target message link corresponding to the target message is obtained. The first operation may be determined according to the actual application situation. For example, the first operation is to click a "copy link" component corresponding to the target message. Specifically, when the user selects a target message that needs to be shared, the "copy link" component is displayed, and in response to the triggering operation by the user for the copy link component, the target message link corresponding to the target message is obtained.

The first conversation may be an ordinary dialogue group or a topic group with a topic function. Furthermore, the target message may be an instant message in the dialogue group or an original post message or a reply message to the original post in the topic group. It should be noted that the target message is an instant message that has been posted on the wall in the first conversation.

Figure 2A:
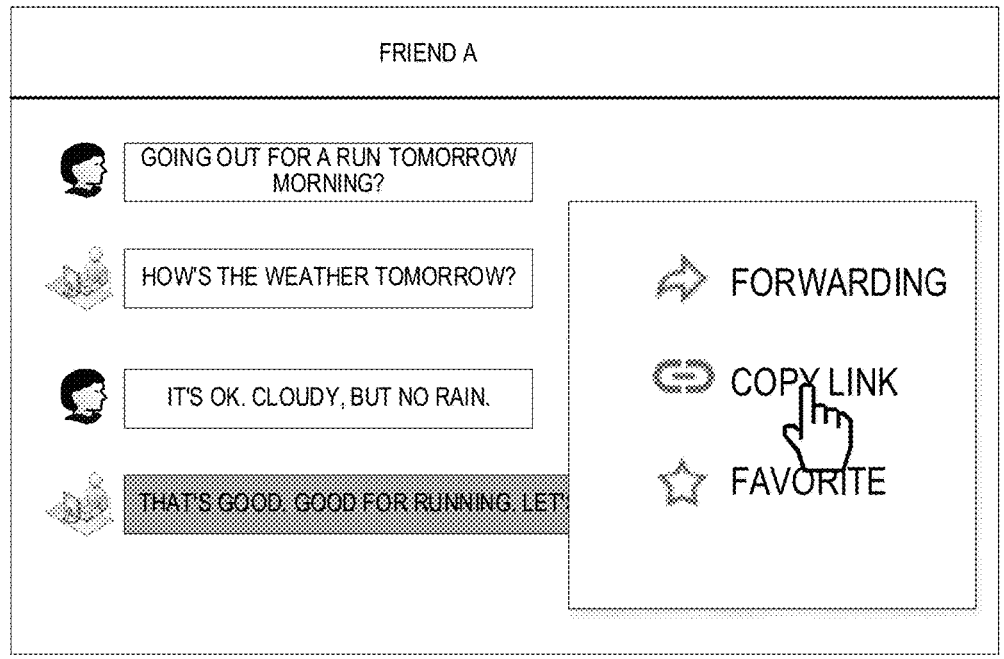
FIG. 2a is a schematic diagram of a scenario for determining a single target message provided by an embodiment of the present application.
Figure 2B:
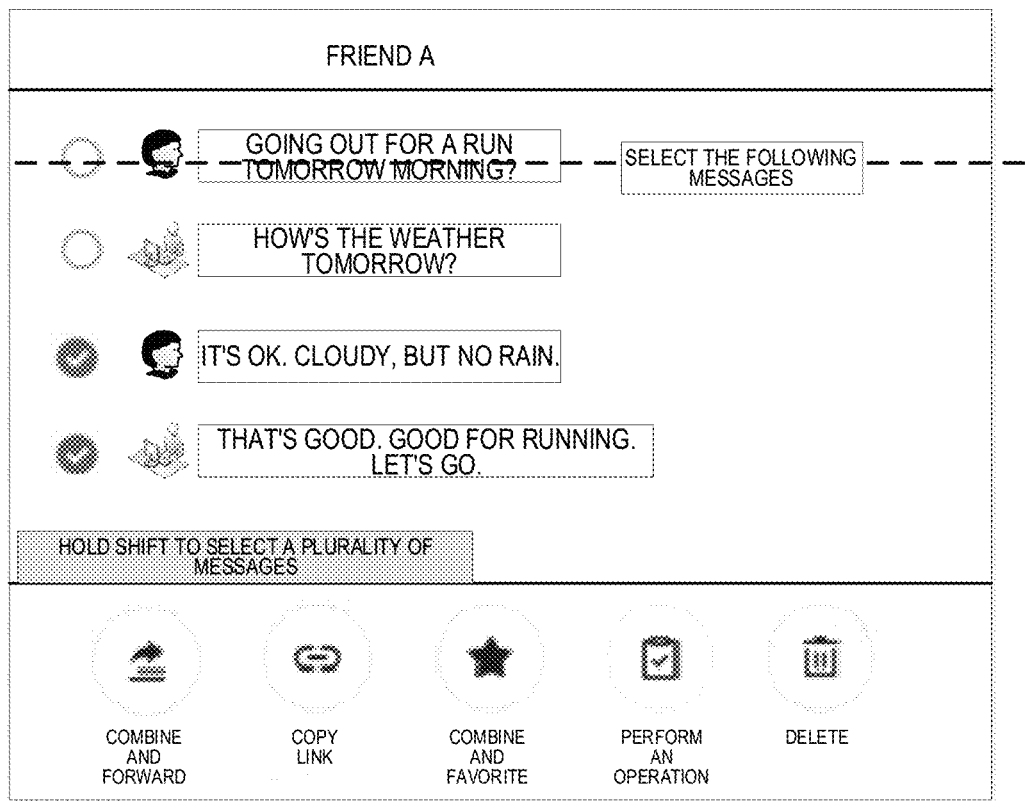
FIG. 2b is a schematic diagram of a scenario for determining a plurality of target messages provided by an embodiment of the present application.

When the user triggers the first operation for a single target message, the target message link corresponding to the single target message is obtained. For example, as shown in FIG. 2a, the target message to be shared is selected, and in response to the selection operation by the user, a page including a copy link component is displayed, and the user obtains the target message link corresponding to the target message by clicking on the copy link component. When the user triggers the first operation for a plurality of target messages at one time, a message link corresponding to each target message in the plurality of target messages is obtained; the target message link is generated based on the message links corresponding to the plurality of target messages, and the target message link is used to indicate the plurality of target messages. For example, as shown in FIG. 2b, when the user selects a plurality of target messages at one time, the copy link component is displayed in response to a selection operation by the user, and the user triggers the copy link component to obtain the message link corresponding to each target message of the plurality of target messages.

When the user selects a plurality of target messages at one time and the number of messages selected one time is equal to the predetermined value, the user will be restricted from continuing to select instant messages. When the number of target messages to be selected is greater than the predetermined value, a first prompt message will be displayed to prompt the user to select the predetermined pieces of information at most.

Optionally, after obtaining the target message link corresponding to the target message, a second prompt message may be displayed. The second prompt message is configured to prompt the user that the target message link has been copied to the pasteboard.

S102: in response to a second operation triggered in a target application, adding the target message link to a page of the target application.

After obtaining the target message link, when the user triggers a second operation in the target application, the target message link is added to the page of the target application. After the target application obtains the target message link, the target application may obtain the target message by parsing the target message link, and then present the target message on the page of the target application. The second operation may include a pasting operation or an adding operation.

Figure 2C:
FIG. 2c is a schematic diagram of a method for displaying a target message link provided by an embodiment of the present application.
Figure 2C:
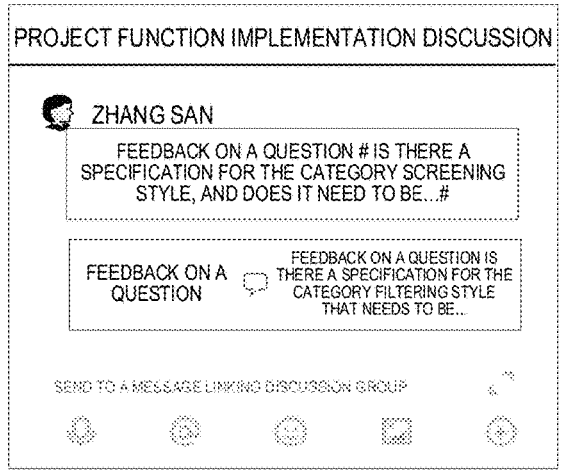
Figure 2C:
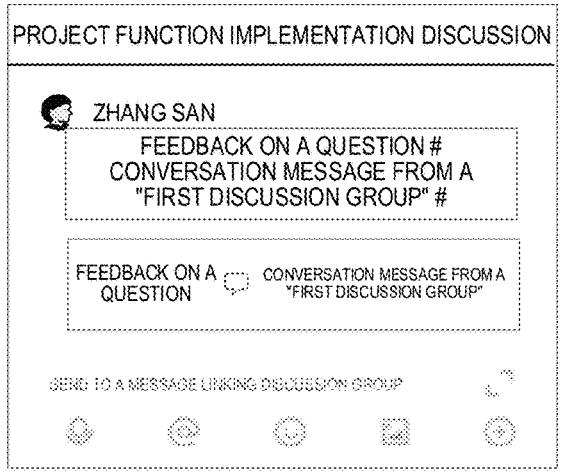

After the target message link is added to the page of the target application, the target message link or a text link corresponding to the target message link can be displayed on the page of the target application. The text link includes the target message, a user identification of a user who sends the target message or source information of the target message, etc. That is, the target message link can be displayed in the page of the target application, for example, the Uniform Resource Locator (URL) can be displayed. Alternatively, a text link corresponding to the target message link is displayed on the page of the target application, and the text link can be clicked. For example, as shown in FIG. 2c, taking that the target application is another conversation in IM as example, the URL is displayed in the first picture, the icon and message content are displayed in the second picture, and the icon and message source are displayed in the third picture.

In practical applications, further display distinctions can be made for different application scenarios. In response to the user adding a target message link in the cloud document, the target message link, the target message, and the association information corresponding to the target message are displayed in the cloud document. There are two ways to add the target message link in the cloud document. One is to paste the target message link into the cloud document through a shortcut key. For example, in a mobile application scenario, a paste component is invoked by long pressing in the input mode of the cloud document, so that the target message link can be pasted into the cloud document through the paste component; in a PC application scenario, the target message link is pasted into the cloud document through right-click or keyboard shortcut key in the input mode. The other method is to trigger the add component in the cloud document to invoke a component for adding new chat records, and then paste the target message link into the displayed input box by triggering the chat record component.

Figure 2D:
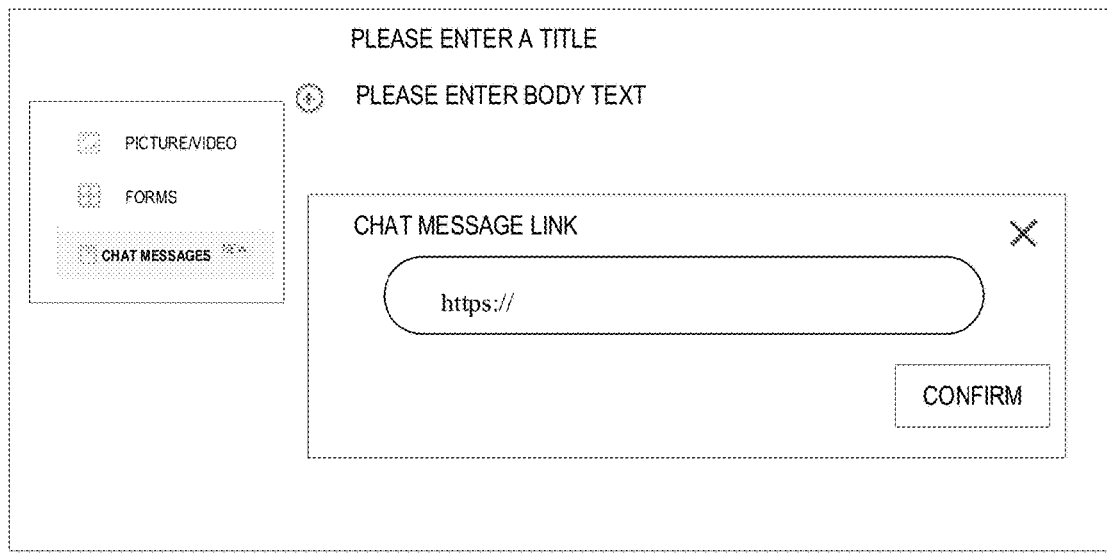
FIG. 2d is a schematic diagram of adding a target message link in a cloud document provided by an embodiment of the present application.

For example, as shown in FIG. 2d, by triggering the add component "+" in the cloud document, the selection page is displayed, and a chat record component is included in the selection page. The input box is displayed by triggering the chat record component, and the target message link is pasted into the input box.

The association information may include a source of the target message, a user identification of a user who sends the target message, and sending time. That is, when the user adds a target message link into the cloud document, the target message link, the target message (message content), the source of the target message, user identification sending the target message and the time when the target message is transmitted may be displayed in the cloud document.

In a specific implementation, the target message link, the target message, and the association information corresponding to the target message can be shown in the cloud document in the following ways: one is to display them in the form of information blocks; the other is to implement them in a clipping method.

For the first display method, when the user adds the target message link to the cloud document, a placeholder box is displayed at the adding position, and the target message link, the target message, and the association information corresponding to the target message are displayed in the placeholder box. The placeholder box may include a title card and a content card. The title card is configured to present the target message link, and the content card is configured to present the target message and the association information corresponding to the target message. Further, the title card may also include a title name and a copy component. The title name is determined according to a source of the target message, and the copy component is configured to copy the target message link. Specifically, when the message comes from a single chat, the title name is "Conversation Record of First user and Second user", where the first user and the second user are both parties of the single chat; when the message comes from a group chat, the title name is "Group Chat Conversation Record"; when the message comes from a main post in the topic group, the title name is "Topic of Third user", and the third user is the user who initiates the topic; when the message comes from the reply of the topic audience, the title name should be "Group Conversation Record". Furthermore, the title card may also include a conversation entry component, and the user may enter the conversation page where the target message is located by triggering this component.

Figure 3A:
FIG. 3a is a schematic diagram of displaying a title card provided by an embodiment of the present application.
Figure 3A:
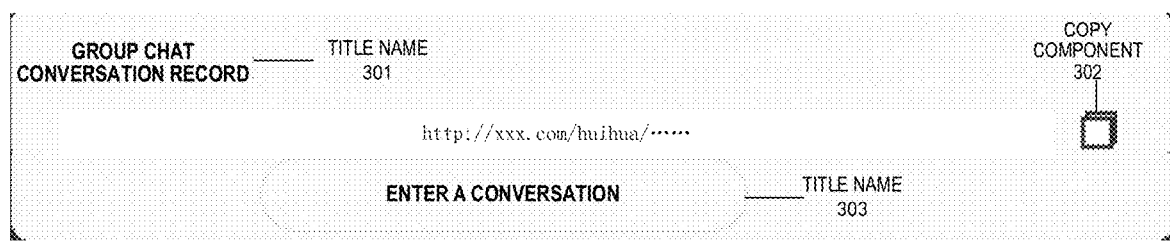
Figure 3B:
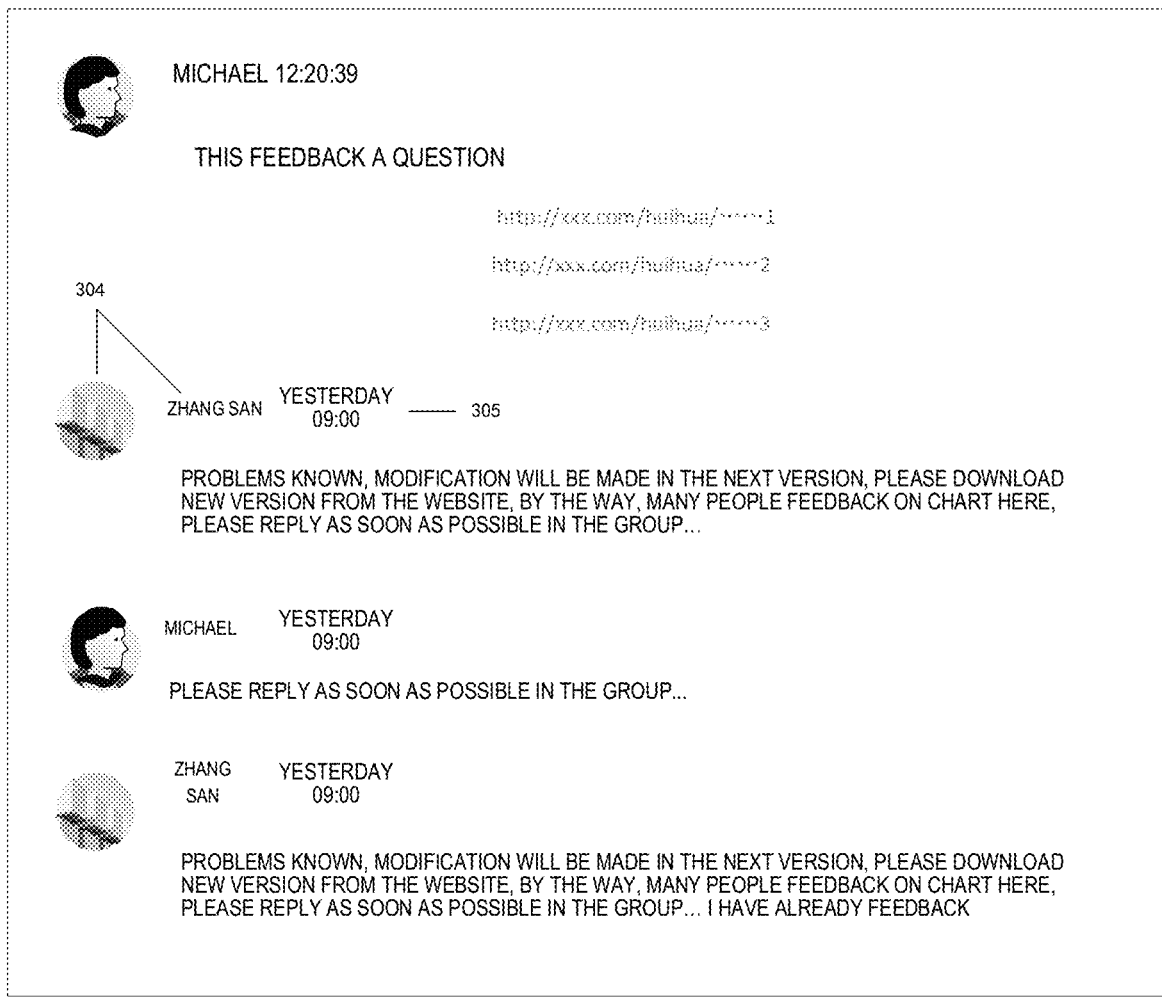
FIG. 3b is a schematic diagram of displaying a content card provided by an embodiment of the present application.

For example, in the schematic diagram of a title card shown in FIG. 3a, the title card 300 may include a title name 301, a copy component 302 and a conversation entry component 303. Referring to the schematic diagram of the content card shown in FIG. 3b, it includes a user identification 304 and a sending time 305. The user identification 304 may include a user avatar, a username, a user nickname, etc. The user avatar displayed in the content card can be clicked, and in response to a triggering operation by the user for user avatar displayed in the corresponding content card, the personal homepage of a user corresponding to the user avatar is displayed.

Figure 3C:
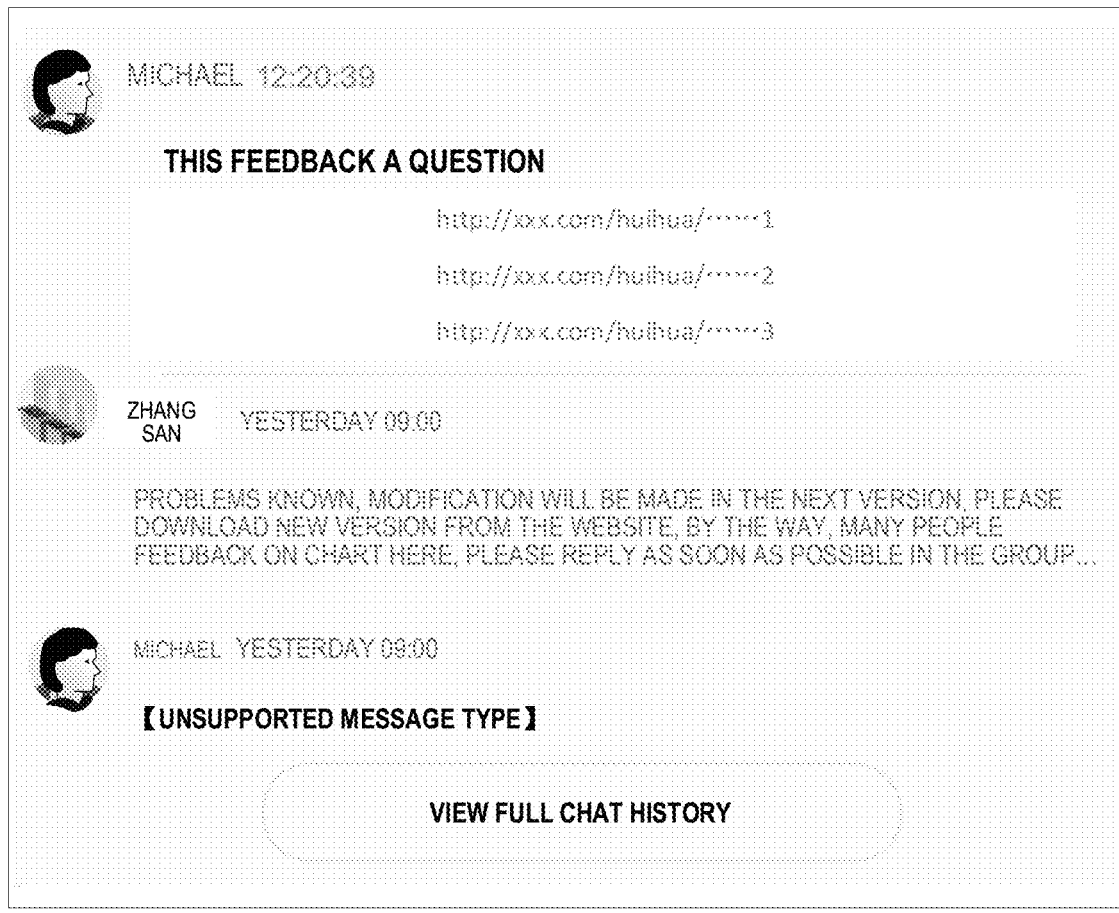
FIG. 3c is a schematic diagram of displaying another content card provided by an embodiment of the present application.

When using a content card to display the target message and the association information corresponding to the target message, a height of the content card can be predefined. When the height of the target message is greater than the height of the content card, the slide component or view component can be displayed to allow the user to view the context by operating the slide component, or view the full message by triggering the view component. For example, as shown in FIG. 3c, when the text height of the target message is greater than the height of the content card, a component for viewing complete chat record is displayed. When the user clicks on this component, a modal window can be popped up to view all instant messages in the modal window through scrolling.

In response to the user having an access permission to the cloud document, the user may comment on the target message in the content card; and in response to the comment operation triggered by the user, the comment added by the user to the target message is obtained, and corresponding processing is completed. Specifically, the cloud document obtains the comment added by the user to the target message, and displays the added comment in a comment content display area of the cloud document.

For the second display method, when the user adds the target message link to the cloud document, the target message link, the target message, and the association information corresponding to the target message will be displayed directly without using a placeholder box for display. Specifically, the target message link is displayed in the title card, and the target message and association information corresponding to the target message are displayed in the content presentation area. The title card may also include a title name, a copy component and other information. The title name is determined based on the source of the target message, and the copy component is configured to copy the target message link. All the target messages may be displayed in the content display area according to the cloud document tiling.

Optionally, when the user has an editing permission to the cloud document, the user may edit the target message in the content display area. In response to an editing operation triggered by the user, the editing operation triggered by the user for the target message is received, and the corresponding processing is completed. Specifically, when the user edits the target message displayed in the cloud document, the edited message is obtained and displayed in the content display area. Further, with an edit permission, the user can also make scratch comments to and/or mark the target message in the content display area. In response to the comment added by the user to the target message, the cloud document will display the added comment in the comment content display area, or the mark added by the user is displayed in the content display area. The marks may include highlighting, underlining, etc.

Optionally, when the user has an access permission to the cloud document, the user may make scratch comments and marks for the target message in the content display area, and in response to the triggering operation by the user, a comment and/or a mark added by the user to the target message in the content display area is received and the corresponding processing is completed. Specifically, the cloud document obtains the comments added by the user to the target message and displays the added comments in the comment content display area, or the cloud document obtains the mark added for the target message and presents it in the content display area.

When the user adds a target message link to another conversation (second conversation) and the target message link corresponds to a plurality of target messages, the target message link and a predetermined number of target messages are displayed in the second conversation. In order to avoid a large number of target messages corresponding to the target message link from occupying a large area of the conversation page during display, the number of messages displayed can be predetermined. When the number of target messages corresponding to the target message link is greater than the predetermined number, the predetermined number of target messages are displayed on the page of the second session; when the number of target messages corresponding to the target message link is less than or equal to the predetermined number, all target messages are displayed on the page of the second conversation.

Figure 3D:
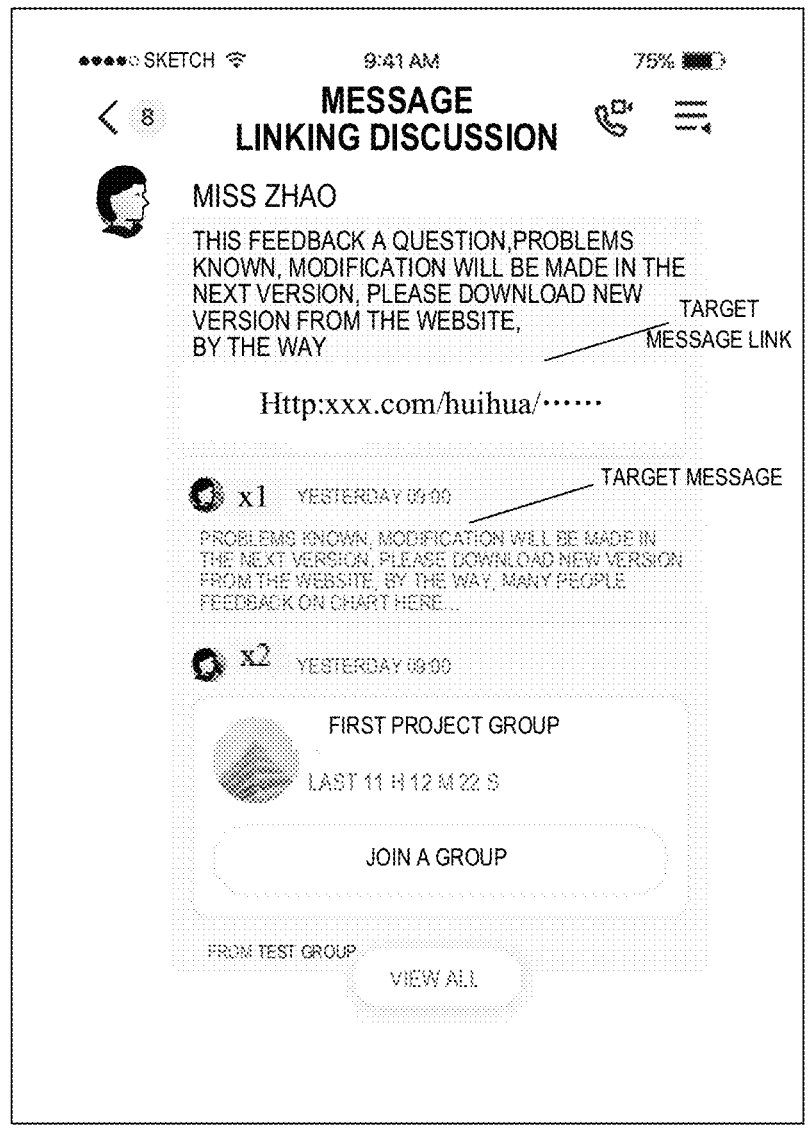
FIG. 3d is a schematic diagram of displaying a target message link in IM provided by an embodiment of the present application.

For example, as shown in FIG. 3d, a target message link is added to a second conversation in IM, and the target message link and the target message corresponding to the target message link are displayed on the page of the second conversation.

When the user adds a target message link into the browser, it is determined whether a target client is installed on the terminal device where the browser is located; if the target client exists locally on the terminal device, the target client is started; in response to the user having an access permission to the target message and the target client having been logged in, the target message will be displayed on the target client according to the target message link. That is, when the user adds a link for copying the target message to the browser, and the terminal device used by the user is installed with the target client and has an access permission to the target message, the target client is used to display the target message. Among them, the instant messaging application is integrated into the target client, and the target client may be a mobile client or a PC client. Specifically, the target client may be enterprise collaboration software. The enterprise collaboration software refers to a suite of software that integrates any of a variety of functions such as address books, instant messaging tools, meetings, cloud documents, approvals, cloud disks, emails, calendars, etc. That is, when the target message link is added to the browser, if there is a target client in the terminal device where the browser is located, and the condition for access permission is met and target client has been logged in, the target client is utilized to jump to a conversation page to view the target message.

When the user adds the target message link to the browser and there is no target client on a terminal device where the browser is located, the web client is started; in response to the user having an access permission to the target message and the web client having been logged in, the target message is displayed on the web client according to the target message link. That is, when the target message link is added to the browser, if there is no target client on a terminal device where the browser is located, the web client is utilized to jump to the conversation page of the first conversation to view the target message.

If there is no access permission, the jump may be blocked through a pop-up window. When the target client or the web client has not yet logged in, in response to launching the target client or web client, it is guided to the login page to realize client login. The target client may be collaborative work software, a multi-functional application integrating IM, cloud documents application, workbench application, calendar application and video conferencing application.

Figure 3E:
FIG. 3e is a schematic diagram illustrating a situation when the user does not have an access permission to the target message provided by an embodiment of the present application.

Optionally, in response to triggering the target message link in the target application by the user, the conversation page of the first conversation where the target message is located is jumped to. After the user adds the target message link to the target application, in response to the triggering operation by the user on the target message link, the conversation page of the first conversation where the target message is located is jumped. Specifically, in order to ensure the security of information, when the user has an access permission to the target message, in response to triggering the target message link by the user, the page of the first conversation where the target message is located will be jumped to. When the user does not have the access permission to the target message, it can be blocked through a pop-up window. As shown in FIG. 3e, when the user does not have an access permission to the target message, a pop-up window is displayed in response to the triggering operation by the user on the target message link. The pop-up window may include a title "Permission Restrictions", the content "Sorry, you do not have the access permission at the moment" and a triggerable operation component.

It can be seen that in response to the first operation triggered by the user for the target message in the first conversation, the target message link corresponding to the target message is obtained. After obtaining the target message link, in response to the second operation triggered by the user in the target application, the target message link is added to the page of the target application, so that the target message link is displayed in the page of the target application. Further, when the user triggers the target message link added in the target application, the page of the first conversation where the target message is located is jumped to, so that the user can view the context information of the target message. That is, this application links the target message so that the target message link corresponding to the target message can be added to other applications to achieve sharing of the target message to other applications. Furthermore, the source of the message can also be traced through the target message link, thereby enhancing the circulation of the message and improving the user experience.

In a specific implementation, when the shared target message is withdrawn in the conversation page of the source conversation (the first conversation), in response to the triggering operation on the target message link, it is possible to continue jumping to locate the location where this target message was withdrawn.

For target message links shared to other IM conversations, they may be divided into the following permission scenarios:

When the target message is a single chat message, the users having the message access permission are the two parties in the single chat.

When the target message is a message in a public group, the users having the message access permission are all users in the current tenant. In response to any user in the tenant clicking the target message link to join the public group, the location of the target message on the first conversation page is jumped to.

When the target message is a message in a small public group, the users having the message access permission are all users in the current tenant. In response to any user in the tenant clicking the target message link to join the small public group, the location of the target message on the first conversation page is jumped to.

When the target message is a message in a private group or a small private group, the users having the message access permission are users in the private group or the small private group. In response to a user in the group clicking the target message link, the location of the target message on the first conversation page is jumped to.

The target messages in the embodiments of this application may be of various types, such as message text, pictures, multimedia files, emails, schedules, emoticons, labels, etc. The multimedia files include audio/video files.

Based on the above method embodiments, the embodiments of the present application provide an apparatus and device for processing an instant message, which will be described below with reference to the accompanying drawings.

Figure 4:
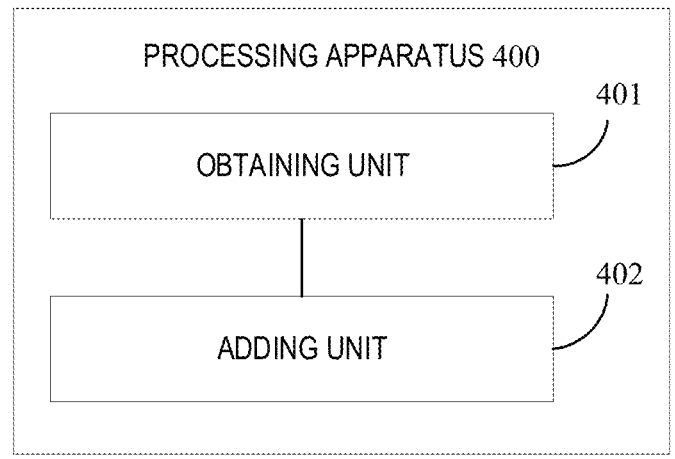
FIG. 4 is a schematic structural diagram of an apparatus for processing an instant message provided by an embodiment of the present application.

Refer to FIG. 4, FIG. 4 is a structural diagram of a device for processing an instant message provided by an embodiment of the present application. As shown in FIG. 4, the apparatus may include: an obtaining unit 401 and an adding unit 402.

the obtaining unit 401 is configured to, in response to a first operation triggered for a target message in a first conversation in an instant messaging application, obtain a target message link corresponding to the target message;

the adding unit 402 is configured to, in response to a second operation triggered in a target application, add the target message link to a page of the target application.

In a specific implementation, the device further includes a display unit;
the display unit is configured to present the target message in the page of the target application.

In a specific implementation, the device further includes a jumping unit;
the jump unit is configured to, in response to an operation of triggering the target message link in the target application by a user, jump to a conversation page of the first conversation where the target message is located.

In a specific implementation, the jump unit is specifically configured to, in response to triggering the target message link in the target application by the user and the user having an access permission to the first conversation, jump to the page of the first conversation where the target message is located.

In a specific implementation, the target application is a cloud document application, a calendar application, an email application, a browser application or other instant messaging application; or the target application is the instant messaging application, and the page of the target application is a page other than a conversation page of the first conversation.

In a specific implementation, the obtaining unit 401 is specifically configured to, in response to the first operation triggered by a user for a plurality of the target messages, obtain a message link corresponding to each of the target messages; and generate a target message link according to the message links corresponding to the plurality of target messages, the target message link being used to indicate the plurality of target messages.

In a specific implementation, the adding unit 402 is specifically configured to, in response to the second operation triggered in the target application, display the target message link or a text link corresponding to the target message link in the page of the target application, the text link including at least one of the following: the target message, a user identification of a user who sends the target message or source information of the target message.

In a specific implementation, the display unit is specifically configured to, in response to the user adding the target message link into the cloud document, present the target message link, the target message, and association information corresponding to the target message in the cloud document.

In a specific implementation, the association information includes one or more of the following: a source of the target message, a user identification of a user who sends the target message, and sending time.

In a specific implementation, the display unit is specifically configured to present the target message link, the target message, and the association information corresponding to the target message in a placeholder box of the cloud document.

In a specific implementation, the placeholder box includes a title card and a content card, the title card is configured to present the target message link, and the content card is configured to present the target message and the association information corresponding to the target message.

In a specific implementation, the display unit is further configured to, in response to a height of the target message being greater than a height of the content card, display a slide component or a view component.

In a specific implementation, the obtaining unit 401 is also configured to, in response to the user having an access permission to the cloud document, obtain a comment added by the user to the target message, and completing corresponding processing.

In a specific implementation, the display unit is further configured to, in response to a triggering operation by the user for a user avatar displayed in the content card, display a personal homepage of a user corresponding to the user avatar.

In a specific implementation, the display unit is specifically configured to display the target message link on a title card and display the target message and the association information corresponding to the target message in a content presentation area.

In a specific implementation, the obtaining unit 401 is also configured to, in response to a user having an edit permission to the cloud document, receive an editing operation triggered by the user for the target message, and complete corresponding processing. Alternatively, the obtaining unit 401 is also configured to, in response to a user having an access permission to the cloud document, receive a comment and/or a mark added by the user to the target message, and complete corresponding processing.

In a specific implementation, the title card also includes a title name and a copy component, the title name is determined according to the source of the target message, and the copy component is configured to copy the target message link.

In a specific implementation, the display unit is specifically configured to, in response to the second user adding the target message link to a second conversation and the target message link corresponding to a plurality of target messages, display the target message link and a predetermined number of target messages in a conversation page of the second conversation.

In a specific implementation, when the target application is a browser, the display unit is specifically configured to, in response to presence of a target client on a terminal device where the browser is located, launch the target client, the target client being integrated with the instant messaging application; and in response to the user having an access permission to the target message and the target client having been logged in, display the target message on the target client according to the target message link.

In a specific implementation, when the target application is a browser, the display unit is specifically configured to in response to absence of a target client on a terminal device where the browser is located, launch a web client, the web client being integrated with the instant messaging application; and in response to the user having an access permission to the target message and the web client having been logged in, display the target message on the web client according to the target message link.

In a specific implementation, the type of the target message includes at least one or more of text, a picture, a multimedia file, an email, a schedule, and a tag.

In a specific implementation, the first conversation is a topic group, and the target message is the original post and/or a reply post in the topic group.

It should be noted that the implementation of each unit in this embodiment can be found in the relevant descriptions of the above method embodiments, and this embodiment will not be repeated here.

Figure 5:
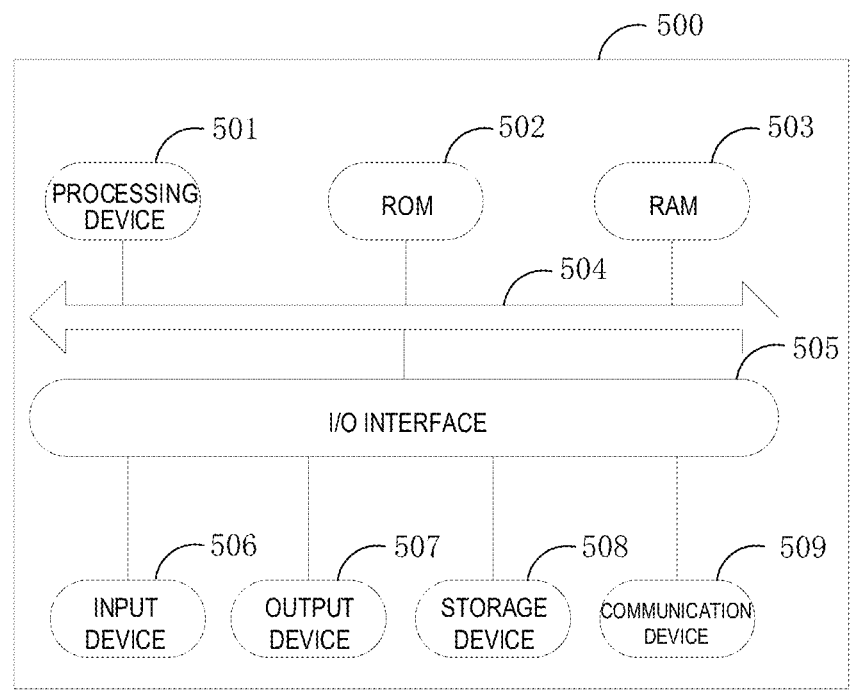
FIG. 5 is a schematic structural diagram of an electronic device provided by an embodiment of the present application.

Referring to FIG. 5, it is a structural schematic diagram of an electronic device suitable for implementing the embodiment of the present application. The terminal device 500 in the embodiment of the present application may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital TVs (television), desktop computers, etc. The electronic device shown in FIG. 5 is only an example and should not bring any limitation on the functionality and scope of use of the embodiment of the present application.

As shown in FIG. 5, the electronic device 500 may include a processing device (such as a central processing unit, graphics processing unit, etc.) 501, which may perform various appropriate actions and processes based on programs stored in Read-Only Memory (ROM) 502 or loaded from storage device 508 into Random Access Memory (RAM) 503. In the RAM 503, various programs and data necessary for the operation of the electronic device 500 are also stored. The processing device 501, ROM 502, and RAM 503 are connected to each other through a bus 504. An Input/Output I/O interface 505 is also connected to the bus 504.

Typically, the following devices can be connected to I/O interface 505: input devices 506 including, for example, touch screens, touchpads, keyboards, mice, cameras, microphones, accelerometers, gyroscopes, etc.; output devices 507 including liquid crystal displays (LCDs), speakers, vibrators, etc.; storage devices 508 including magnetic tapes, hard disks, etc.; and a communication device 509. The communication device 509 may allow the electronic device 500 to communicate with other devices wirelessly or wirelessly to exchange data. Although FIG. 5 shows an electronic device 500 with a plurality of devices, it shall be understood that it is not required to implement or have all of the devices shown. More or fewer devices can be implemented or provided instead.

In particular, according to embodiments of the present application, the process described above with reference to the flowchart can be implemented as a computer software program. For example, an embodiment of the present application includes a computer program product that includes a computer program carried on a non-transitory computer-readable medium, where the computer program includes program code for performing the method shown in the flowchart. In such an embodiment, the computer program can be downloaded and installed from a network through the communication device 509, or installed from the storage device 508, or installed from the ROM 502. When the computer program is executed by the processing device 501, the above functions defined in the method of the embodiment of the present application are performed.

The electronic device provided in this embodiment of the present application and the method for processing an instant message provided in the above embodiments belongs to the invention idea. Technical details that are not described in detail in this embodiment can be found in the above embodiments, and this embodiment has the same beneficial effect as the above embodiments.

An embodiment of the present application provides a computer storage medium on which a computer program is stored, when being executed by a processor, the program implements the method for processing an instant message provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present application, a computer-readable storage medium may be any tangible medium containing or storing a program that can be used by an instruction execution system, apparatus, or device, or can be used in combination with an instruction execution system, apparatus, or device. In the present application, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatuses, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), inter-networks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device executes the above method for processing an instant message.

Computer program codes for performing the operations of the present application may be written in one or more programming languages or a combination thereof, including but not limited to Object Oriented programming languages-such as Java, Smalltalk, C++, and also conventional procedural programming languages-such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including local area network (LAN) or wide area network (WAN)-connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present application. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present application may be implemented by means of software or hardware, and the name of the unit does not constitute a limitation on the unit itself in a certain case, for example, a voice data collecting module may also be described as "a module for collecting data".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

It should be noted that various embodiments are described in the description in a progressive manner. Each embodiment is described focusing on its differences from other embodiments. The same and similar parts between the embodiments can be cross-referenced with each other. For systems or devices disclosed in the embodiments, the descriptions thereof are relatively simple as they correspond to the methods disclosed in the embodiments. For relevant details, please refer to the description of the section for method.

It should be understood that in this disclosure, "at least one" refers to one or more, and "a plurality of" refers to two or more. "And/or" is used to describe an association between associated objects, indicating that there can be three relationships therebetween. For example, "A and/or B" may indicate: only A exists, only B exists, and A and B exist simultaneously. where A and B can be singular or plural. The symbol "/" generally indicates that the related objects are in an "or" relationship. "At least one of the following (item)" or similar expressions thereof refers to any combination of the items, including any combination of a single item or a plurality of items. For example, at least one (item) of a, b or c may refer: a, b, c, "a and b", "a and c", "b and c", or "a and b and c", and a, b, c can be singular or plural.

It should also be noted that in this article, relational terms such as first and second are only used to distinguish one entity or operation from another entity or operation, which do not necessarily imply any actual relationship or sequence therebetween. Furthermore, the terms "comprises", "includes" and any other variations thereof are intended to cover a non-exclusive inclusion such that a process, method, article, or apparatus including a series of elements includes not only those elements, but also other elements not expressly listed, or elements inherent to the process, method, article or device. Without further limitation, elements defined by the statement "comprises a . . . " does not exclude the presence of additional identical elements in a process, method, article, or apparatus that includes the stated element.

The steps of the methods or algorithms described in conjunction with the embodiments disclosed herein may be implemented directly in hardware, in software modules executed by a processor, or in a combination of the two. Software modules may be located in random access memory (RAM), memory, read only memory (ROM), electrically programmable ROM, electrically erasable programmable ROM, registers, hard disks, removable disks, CD-ROMs, or any other form of storage media commonly known in the art.

The above description of the embodiments of the present application enables those skilled in the art to implement or use the present application. Various modifications to these embodiments will be apparent to those skilled in the art, and the general principles defined herein may be implemented in other embodiments without departing from the spirit or scope of the disclosure. Therefore, the present application is not to be limited to the embodiments shown herein but shall comply with the widest scope consistent with the principles and novel features disclosed herein.

We claim:

1. A method for processing an instant message, comprising:
   in response to a first operation triggered for a target message in a first conversation in an instant messaging application, obtaining a target message link corresponding to the target message;
   in response to a second operation triggered in a target application, adding the target message link to a page of the target application; and
   presenting the target message in the page of the target application,
   wherein the target application is a browser application, and presenting the target message in the page of the target application comprises:
      in response to presence of a target client on a terminal device where the browser is located,
         launching the target client the target client being integrated with the instant messaging application, and
         in response to a user having an access permission to the target message and the target client having been logged in, displaying the target message on the target client according to the target message link: or
      in response to absence of the target client on the terminal device where the browser is located,
         launching a web client, the web client being integrated with the instant messaging application; and
         in response to the user having the access permission to the target message and the web client having been logged in, displaying the target message on the web client according to the target message link.

2. The method of claim 1, wherein the method further comprises:
   in response to an operation of triggering the target message link in the target application by the user, jumping to the conversation page of the first conversation where the target message is located.

3. The method of claim 2, wherein in response to the operation of triggering the target message link in the target application by the user, jumping to the conversation page of the first conversation where the target message is located comprises:
   in response to triggering the target message link in the target application by the user and the user having an access permission to the first conversation, jumping to the conversation page of the first conversation where the target message is located.

4. The method of claim 1, wherein
   the target application is a cloud document application, a calendar application, an email application, a browser application or other instant messaging application; or
   the target application is the instant messaging application, the page of the target application being a page other than a conversation page of the first conversation.

5. The method of claim 1, wherein in response to the first operation triggered for the target message in the first conversation in the instant messaging application, obtaining the message link corresponding to the target message comprises:
   in response to the first operation triggered by the user for a plurality of target messages, obtaining a message link corresponding to each target message; and
   generating a target message link according to the message links corresponding to the plurality of target messages, the target message link being used to indicate the plurality of target messages.

6. The method of claim 1, wherein in response to the second operation triggered in the target application, adding the target message link to the page of the target application comprises:
   in response to the second operation triggered in the target application, displaying the target message link or a text link corresponding to the target message link in the page of the target application, the text link comprising at least one of the target messages, a user identification of a user who sends the target message or source information of the target message.

7. The method of claim 1, wherein in response to the target application being a cloud document application, presenting the target message in the page of the target application comprises:
    in response to the user adding the target message link into a cloud document, presenting in the cloud document the target message link, the target message, and association information corresponding to the target message.

8. The method of claim 7, wherein the association information comprises one or more of a source of the target message, a user identification of a user who sends the target message, and a sending time.

9. The method of claim 7, wherein presenting, in the cloud document, the target message link, the target message, and the association information corresponding to the target message comprises:
    presenting the target message link, the target message, and the association information corresponding to the target message in a placeholder box of the cloud document.

10. The method of claim 9, wherein the placeholder box comprises a title card and a content card, the title card being used to present the target message link, the content card being used to present the target message and the association information corresponding to the target message.

11. The method of claim 10, wherein the method further comprises:
    in response to a height of the target message being greater than a height of the content card, displaying a slide component or a view component.

12. The method of claim 7, wherein the method further comprises:
    in response to the user having an access permission to the cloud document, obtaining a comment added to the target message by the user, completing a corresponding process.

13. The method of claim 7, wherein the method further comprises:
    in response to a triggering operation for a user avatar displayed in a content card by the user, displaying a personal homepage of the user corresponding to the user avatar.

14. The method of claim 7, wherein presenting, in the cloud document, the target message link, the target message, and the association information corresponding to the target message comprises:
    displaying the target message link on a title card and displaying, in a content presentation area, the target message and the association information corresponding to the target message.

15. The method of claim 1, wherein the method further comprises:
    in response to the user adding the target message link to a second conversation and the target message link corresponding to a plurality of target messages, displaying, in a conversation page of the second conversation, the target message link and a predetermined number of target messages.

16. An electronic device, comprising: a processor and a memory;
    the memory, configured to store instructions or computer programs;
    the processor, configured to execute the instructions or computer programs in the memory, so that the electronic device performs a method comprising:
        in response to a first operation triggered for a target message in a first conversation in an instant messaging application, obtaining a target message link corresponding to the target message;
        in response to a second operation triggered in a target application, adding the target message link to a page of the target application; and
        presenting the target message in the page of the target application,
        wherein the target application is a browser application, and presenting the target message in the page of the target application comprises:
            in response to presence of a target client on a terminal device where the browser is located,
                launching the target client, the target client being integrated with the instant messaging application; and
                in response to a user having an access permission to the target message and the target client having been logged in, displaying the target message on the target client according to the target message link; or
            in response to absence of the target client on the terminal device where the browser is located,
                launching a web client, the web client being integrated with the instant messaging application; and
                in response to the user having an access permission to the target message and the web client having been logged in, displaying the target message on the web client according to the target message link.

17. A non-transitory computer-readable storage medium, wherein the computer-readable storage medium storing instructions thereon, in response to being run on a device, the instructions cause the device to perform a method comprising:
    in response to a first operation triggered for a target message in a first conversation in an instant messaging application, obtaining a target message link corresponding to the target message;
    in response to a second operation triggered in a target application, adding the target message link to a page of the target application; and
    presenting the target message in the page of the target application,
    wherein the target application is a browser application, and presenting the target message in the page of the target application comprises:
        in response to presence of a target client on a terminal device where the browser is located,
            launching the target client, the target client being integrated with the instant messaging application; and
            in response to a user having an access permission to the target message and the target client having been logged in, displaying the target message on the target client according to the target message link; or
        in response to absence of the target client on the terminal device where the browser is located,
            launching a web client the web client being integrated with the instant messaging application; and
            in response to the user having an access permission to the target message and the web client having been logged in, displaying the target message on the web client according to the target message link.

\* \* \* \* \*